Jan. 9, 1923.
L. P. HALLADAY.
HOOK BOLT.
FILED JAN. 26, 1922.
1,441,498.
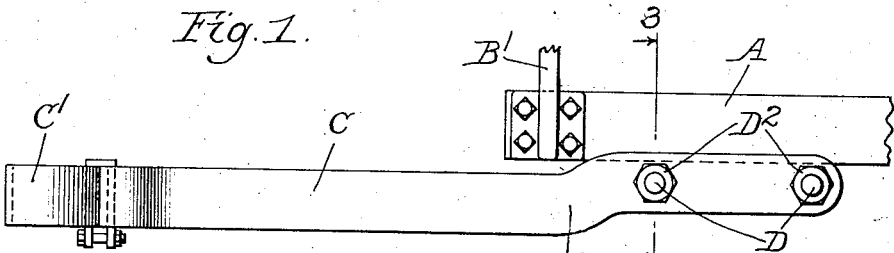
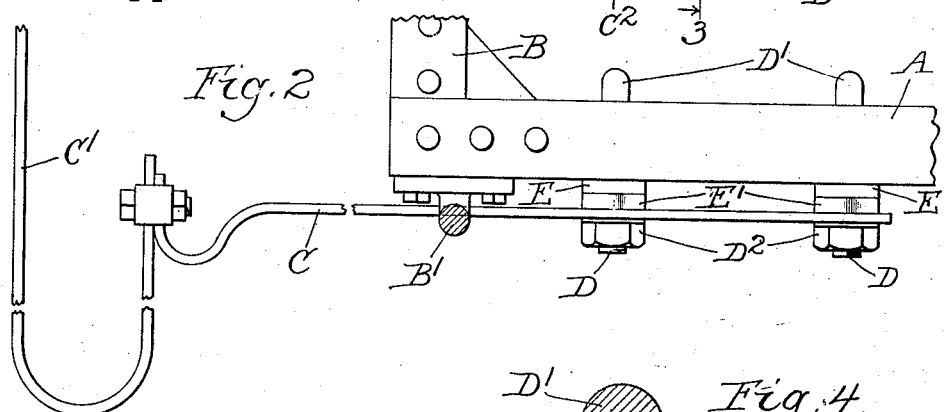
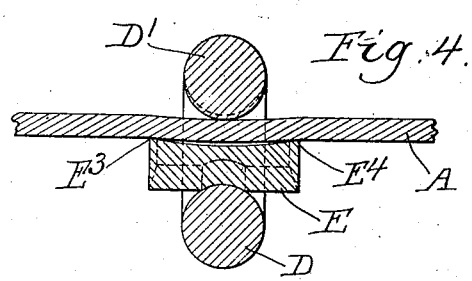
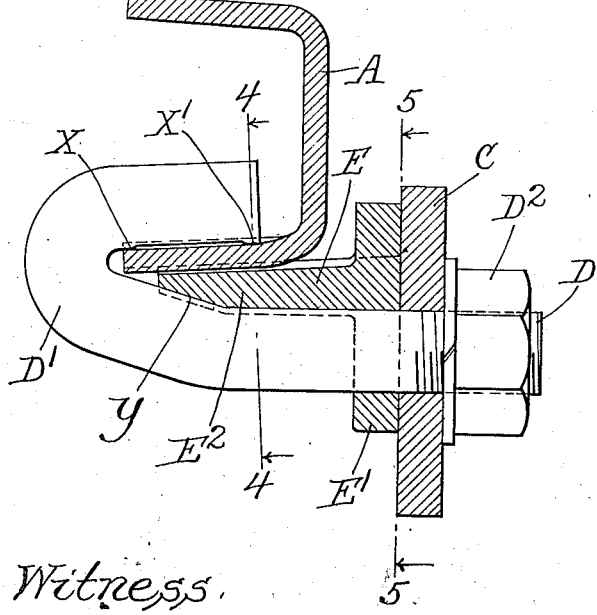
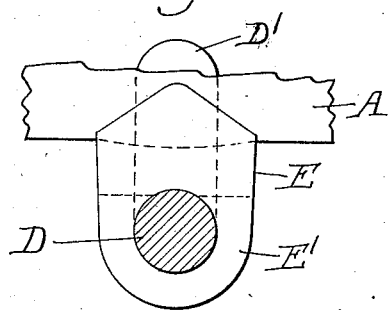
Witness.
Edwar T. Wray.
Inventor.
Lewis P. Halladay.
by Parker & Carter
Attorneys.

Patented Jan. 9, 1923.

1,441,498

UNITED STATES PATENT OFFICE.

LEWIS P. HALLADAY, OF DECATUR, ILLINOIS.

HOOK BOLT.

Application filed January 26, 1922. Serial No. 531,844.

*To all whom it may concern:*

Be it known that I, LEWIS P. HALLADAY, a citizen of the United States, residing at Decatur, in the county of Macon and State of Illinois, have invented a certain new and useful Improvement in Hook Bolts, of which the following is a specification.

This invention relates to a hook bolt adapted primarily for use in connection with mounting bumper bars upon frames of vehicles, and particularly upon automobiles.

The invention is illustrated more or less diagrammatically in the accompanying drawings, wherein:

Figure 1 is a side elevation showing the bumper bar in position upon the frame of an automobile;

Fig. 2 is a plan view of Figure 1;

Fig. 3 is a vertical cross section taken on the line 3—3 of Figure 1;

Fig. 4 is a cross section taken on the line 4—4 of Figure 3;

Fig. 5 is an end elevation of the wedge member taken on the line 5—5 of Figure 3.

Like parts are designated by like characters throughout.

A indicates one of the channel section side frame members of an automobile chassis. These members are fastened together at one end between cross members B, adjacent which an upwardly extending lamp bracket B' is mounted.

C is one of a pair of bumper bar supporting rods which carries at its forward end one end of the bumper bar C', the details of which are not shown as they form no part of the present invention.

D is the hook bolt. It is composed of a hook shaped member as shown which has a straight shank and a curved end D' adapted to surround and overlie the lower flange of the channel section A, and to be in contact with it only on its upper surface, and preferably only at two points, X and X', although it may be in contact with it at other points on its upper surface.

Threaded upon the straight shank of the bolt D is the wedge member E which is adapted to lie between the lower flange of the channel member A and the bolt, and to contact the lower side of the flange and to be wedged between the end curved portion D' of the bolt and to contact the bolt with a wedge action at the point Y.

The channel sections normally used in making the frames of automotive vehicles are formed so that the flanges of the sections are not parallel and are not at right angles to the side of the section, thus the upper and lower flanges of the channel section, as shown in Figure 3, are not at right angles to the vertical portion of the section.

In order to allow for this peculiarity in construction common to practically all automobile frames, and in order that the carrying bars C shall themselves be vertical, the wedge member E is provided with a vertical web E', which is not at right angles to the projecting member $E^2$. Thus when the wedge member E is in the position shown in Figure 3, the portion E is parallel to the lower flange of the channel section A, whereas the portion E' is parallel to the vertical portion of the section, and A is obviously itself vertical. The carrying bar C is threaded upon the straight shank D of the bolt, and the entire assembly is drawn and held in fixed position by means of the nut $D^2$.

The upper surface of the wedge member E is hollow, as shown in Figure 4, and is adapted normally to make a two point contact with the under surface of the lower flange of the member A. This contact is at the point $E^3$ and $E^4$. Sufficient tightening of the nut $D^2$ will cause the member E, in combination with the hook bolt D, D', to grip the lower flange of the member A with such force as to bend it as shown in Figure 4, and thus a very positive grip is established.

The use and operation of this invention are as follows:

This invention is designed primarily for use where it is desirable to have an exceedingly simple means of attachment. Thus it is well adapted for use where no adjustment of the holding bar upon the bolt is necessary. It is also well adapted for use where the chassis is of unusual shape, or where the frame has mounted upon it projecting members such, for example, as the lamp bracket here shown.

The bumper carrying bar is perforated in two places and is bent where necessary to avoid lamp brackets and other projections, and a single hook bolt is inserted in each of the perforations. The inner ends of the hook bolt are then hooked over the flange of the frame member and tightened. The tightening draws the bolt in upon the flange of the frame member and also forces the wedge member between the bolt and the lower side of the flange, so that the bolt is normally not in contact with the under side of the flange. It will be noticed that the construction of the wedge member is such that the wedge portion is parallel to the lower flange of the frame, whereas the vertical portion is truly vertical and is parallel with the side of the frame member. The bumper carrying bar may, therefore, be drawn snug against that portion of the wedge member and will be vertical. If this carrying bar were canted laterally, the problem of attaching the bumper to the bumper carrying bar would be complicated and I have therefore provided a construction to avoid canting of the bumper carrying bar.

When the parts are as shown in Figures 1 and 2, the nuts are tightened and the hook bolts are drawn progressively upon the flange. If sufficient force is exerted the flange will actually be bent as shown in Figure 4.

I claim:

1. A support for automobile bumper bars comprising a gripping member adapted partially to surround the flange of the automobile frame member, a wedge element adapted to be inserted between said gripping member and said flange and means for longitudinally moving it to clamp said gripping member against said flange, the upper surface of said wedge element being axially hollowed to form substantially parallel flange engaging projections.

2. A support for automobile bumper bars comprising a gripping member adapted partially to surround the flange of the automobile frame member, a wedge element adapted to be inserted between said gripping member and said flange and means for longitudinally moving it to clamp said gripping member against said flange, the upper surface of said wedge element being axially hollowed to form substantially parallel flange engaging projections, the opposed portion of the gripping member being adapted to lie along and between said projections and in opposition to said hollowed portion.

3. A support for automobile bumper bars comprising a gripping member adapted partially to surround the flange of the automobile frame member, a wedge element adapted to be inserted between said gripping member and said flange and means for longitudinally moving it to clamp said gripping member against said flange, said gripping element adapted to engage the flange at a plurality of separated points spaced along the length of the upper arm of the gripping member.

4. A bumper bar support comprising a horizontally placed bar, adapted to be connected at its outer end to a bumper, and adapted at its inner end to be secured to a horizontal automobile frame member, the inner end being perforated at a plurality of points, a plurality of clamping members each adapted to be clamped upon the flange of said horizontal frame member, and each adapted at its outer end to penetrate and be secured to the bumper support, the horizontal bar comprising two horizontal sections connected by an upwardly inclined section, the upper most horizontal section being adapted to be engaged by the clamping members.

Signed at Chicago county of Cook and State of Illinois, this 23rd day of January 1922.

LEWIS P. HALLADAY.